2,973,504

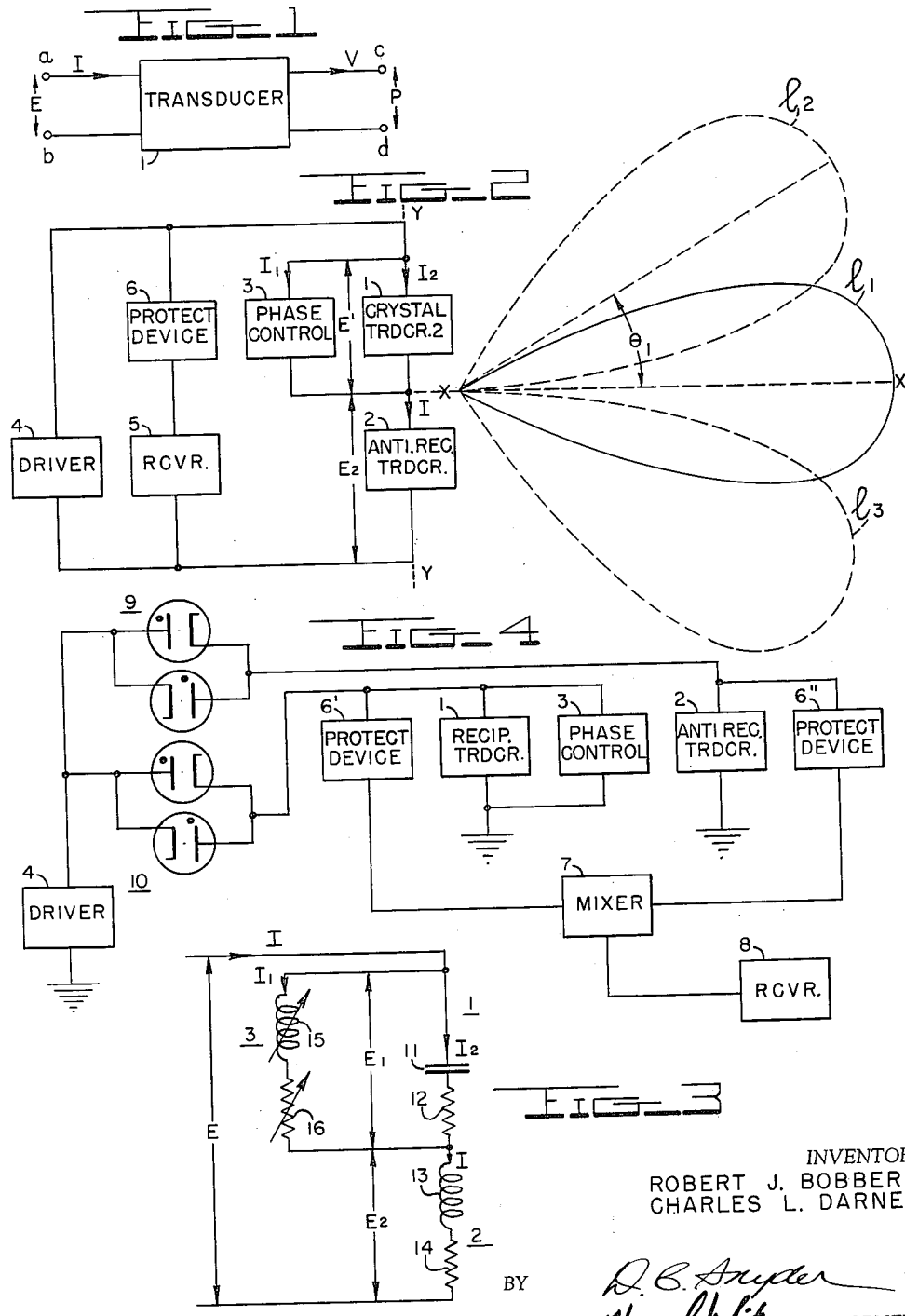
Feb. 28, 1961    R. J. BOBBER ET AL    2,973,504
SONIC ECHO SYSTEM
Filed March 26, 1951
INVENTORS
ROBERT J. BOBBER
CHARLES L. DARNER
ATTORNEYS

United States Patent Office 2,973,504
Patented Feb. 28, 1961

SONIC ECHO SYSTEM

Robert J. Bobber and Charles L. Darner, both of P.O. Box 3629, Orlando, Fla.

Filed Mar. 26, 1951, Ser. No. 217,648

10 Claims. (Cl. 340—1)

(Granted under Title 35, U.S. Code (1952), sec. 266)

This invention relates in general to an object locator system and in more particular a transducer system for providing automatic lobe switching on transmission and reception.

More specifically, the instant invention relates to a multi-directivity pattern, electroacoustic transducer having one response pattern during transmission of a sound wave and a different response pattern during reception of sound waves.

For many applications in pulse echo locators systems it is desirable that the transmitting response directivity pattern of a sound propagation system be of a different shape than the receiving response directivity pattern. For example, in a bearing indicator type of locator system it is frequently desired to transmit energy in one control lobe and to receive reflections on a pair of divergent lobes. Prior are methods of performing this aforementioned change in directivity pattern employ multi-element transducers utilizing switches to throw portions of the transducer in and out of phase with each other. These methods require electronic or electromechanical relays to do the switching which are complex and are not trouble free.

One object of the instant invention therefore is to provide a new transducer system having different directivity response patterns for transmission and reception which is more trouble-free and less complex than prior art systems.

Another object of the instant invention is to provide a new relatively simple transducer system having different directivity response patterns for transmission and reception which has fewer electronic and mechanical components.

These and other objects of the instant invention will become apparent upon making reference to the specification and drawings wherein:

Figure 1 is a block diagram of a transducer showing the important voltages and currents, etc. necessary to the understanding of the terms used to explain the instant invention;

Figure 2 is a simplified diagram of the system forming one embodiment of the instant invention;

Figure 3 is the equivalent circuit for the transducer circuit of Figure 2, and

Figure 4 shows in block diagram form another embodiment of the present invention.

Broadly speaking the instant invention comprises two transducer elements having distinct characteristics and capable of independently propagating energy between a first and a second medium and which are connected together electrically in a manner to be more fully described. The media of the specific example to be disclosed herein are a conductor bounded electronic circuit for propagating electromagnetic signals on one hand and a fluid for propagating mechanical vibrations on the other. It is also possible to use transducers which couple electromagnetic energy propagating in a medium such as free space, e.g., a radio antenna circuit. One element is in itself a transducer whose transfer impedance is of the same sign, regardless of which medium supplies the energy and which receives it. Such a transducer is called a reciprocal transducer. The other element is a transducer having transfer impedances of opposite sign. Such a transducer element is called an anti-reciprocal transducer element. If two such transducers, reciprocal and anti-reciprocal, are fed with electrical energy so that they will independently radiate energy within a common space segment, then the resultant response pattern will have directive qualities irrespective of whether the transducer elements themselves are directive. Because of the fact that one of the transducer elements is anti-reciprocal and the other reciprocal, it can be shown that the point of maximum response of the pattern during transmission or reception will be a minimum respectively during reception or transmission and vice versa.

The specific embodiment which will be hereinafter discussed pertains to electroacoustic transducer systems. An electroacoustic transducer is a device as a piezoelectric crystal or magnetostrictive device which will transmit physical vibrations in response to electrical impulses fed thereto and will generate electrical impulses upon having a physical vibration imparted thereto.

Referring now more particularly to Figure 2 which shows one exemplary embodiment of the instant invention, a piezoelectric crystal type electroacoustic transducer 1 is connected electrically in series with a magnetostrictive or moving coil transducer 2 across a keyed source of sinusoidal driving voltage 4. A piezoelectric electroacoustic transducer is a reciprocal device while magnetostrictive electroacoustic transducers are anti-reciprocal devices. Driver unit 4 may be of any known type, for example, the type comprising an oscillator with a suitable keying means therefor. Transducers of the type mentioned are well known in the art.

The function of the embodiment disclosed in Figure 2 is to provide a single lobe $L_1$ which falls symmetrically about the mechanical axis $x$—$x$ of the transducers in the transmitting response pattern of the transducer system, and to provide a pair of divergent lobes $L_2$ and $L_3$ in the receiving response pattern having a minimum response where lobe $L_1$ has its maximum response along mechanical axis $x$—$x$. The mechanical axis $x$—$x$ is a line of symmetry relative to the transducer units 1—2 and is perpendicular to the line $y$—$y$ along which the transducer units are placed.

As is obvious to those skilled in the art, to have a maximum response along mechanical axis $x$—$x$ requires that the sound waves emitted by transducers 1 and 2 be in phase.

The phase of the sound waves emitted from a crystal type transducer are in general in phase with the charge accumulated thereon (or 90 degrees out of phase with the current fed thereto) while the sound waves of a magnetostrictive, moving coil or other inductive transducer are in phase (or 180 degrees out of phase) with the current fed thereto. Thus, to have the sound waves emitted by transducers 1 and 2 in phase, it is necessary that the currents $I_2$ and $I$ fed respectively to transducers 1 and 2 have a quadrature phase relationship. To obtain this result a phase control circuit 3 is connected in shunt with one of the transducers 1 to provide the proper phase relationship so that the sound waves of the transducers will be in phase.

Since the phase of the currents in a magnetostrictive, moving coil or other inductive sound transducer produces a sound wave in phase or 180 degrees out of phase with the current fed thereto the quadrature relationship may produce either a minimum or maximum along the mechanical axis $x$—$x$. If a minimum is produced with a given connection of transducer 2 in the circuit shown in Figure 2, then reversing the connection of the electrical conductors feeding current to transducer 2 will produce a maximum along mechanical axis $x$—$x$.

Crystal transducer 1 of course must be positioned so that it independently propagates sound waves in an area or space segment common to the area or space segment in which the other transducer independently propagates sound waves. Transducers 1 and 2 may each have a directivity pattern thereby increasing the directivity of the lobes. In order to produce a null, at the angle where a minimum response is desired, the magnitude of the sound waves in each pattern must be identical. The sharp directivity pattern of lobe $L_1$ and $L_2$ and $L_3$ is caused by the reinforcement and cancellation of the separate sound waves emitted by the transducers 1 and 2. In practice the two transducers 1 and 2 are placed together with only a small spacing therebetween.

It can be shown that with a reciprocal transducer element such as crystal transducer 1 and an anti-reciprocal transducer 2 such as a moving coil, magnetostrictive or other inductive transducer associated in the manner just described that the receiving directivity pattern will be such that the maximum receiving response will occur at an angle to the directions along which transmission was a minimum, and the minimum response thereof will occur at an angle to the direction along which the maximum transmitting response occurred. Lobes $L_2$ and $L_3$ show the receiving pattern of the transducer system of one exemplary embodiment of the present invention. If the connections of the conductors carrying current to one of the transducers 1 or 2 were reversed then lobes $L_2$ and $L_3$ would be the transmitting response pattern and lobe $L_1$ would be the receiving response pattern.

In practice more lobes may occur than shown in Figure 2. The number of lobes is controlled by the spacing of the transducer elements as well as by the shape of directivity pattern of the individual transducer elements 1 and 2 and the frequency of the sound propagated by the system.

The concept of a receiving response pattern is not as easy to comprehend as a transmitting response pattern. Assuming that lobes $L_2$ and $L_3$ of Figure 2 represent the receiving response pattern, a signal received from an angle $\theta_1$ relative to mechanical axis $x$—$x$ will produce across the electrical terminals of transducers 1 and 2 voltages $E_1$ and $E_2$ which are in phase. A signal approaching the transducer from along the mechanical axis thereof will produce voltages $E_1$ and $E_2$ which are 180 degrees out of phase, hence the receiving response pattern shows zero response along the mechanical axis and a maximum response at angle $\phi_1$. A signal approaching at an angle between the mechanical axis and angle $\phi_1$ will produce voltages $E_1$ and $E_2$ which vary between the out of phase to the in phase condition.

During transmission it is desirable to prevent the high powered energy from driver 4 from reaching receiver 5 which is coupled across transducers 1 and 2 in order to detect the energy received thereby. Accordingly, protective device 6 is interposed between driver 4 and receiver 5 which substantially prevents the energy from driver 4 from reaching receiver 5. These protective devices may be of any suitable type well known in the art which prevents only high powered energy from reaching receiver 5. The received energy being of low power will therefore be fed to receiver 5 substantially undiminished in amplitude.

It is important for purposes of clarifying the meaning of the terms used in the claims that the concepts of reciprocal and anti-reciprocal transducers be defined. To this end reference is now made to Figure 1 showing an electroacoustic transducer as a four terminal network.

The characters V and P are acoustic parameters representing respectively velocity and force. E represents the voltage applied to the electrical side $a$—$b$ of the network and I is the current flowing into terminals $a$—$b$.

The transfer impedance of the network is $P/I$ and $E/V$. For a reciprocal element like a piezoelectric crystal transducer $P/I=E/V$. For an anti-reciprocal element like a magnetostrictive or moving coil transducer $P/I=-E/V$.

A similar relationship can be established when the acoustic medium for propagating mechanical vibrations is replaced by a medium for propagating electromagnetic waves. The impedance of the latter medium is defined in terms of E and H, electric and magnetic field strengths in place of P and V, respectively, or in terms of equivalent voltages and currents generated at an antenna.

It should be noted that if the sound waves emitted by transducers 1 and 2 vary from the in phase and 180 degrees out of phase condition, that the lobe patterns will shift in position. Nevertheless the condition that the transmitting and receiving patterns have their maximum points in coincidence with the minimum points of the opposed directivity patterns (and vice versa will still be present.

The equivalent electrical circuit of the transducer system is shown in part in Figure 3. The crystal transducer is represented by a series circuit of condenser 11 and resistance 12. The magnetostrictive, moving coil or other inductive transducer 2 is represented by an inductance 13 and resistance 14. The phase control circuit 3 may comprise a variable inductance 15 and resistance 16. If desired the phase control circuit could be placed across the transducer 2 in which case the circuit would probably include a variable capacitance.

The broader aspect of instant invention is not limited to the preferred embodiment of Figure 2 where the transducer elements are in series. Thus, as shown in Figure 4, transducers 1 and 2 are placed in parallel circuit relation relative to driver 4. Non-linear devices 9 and 10, each consisting of a parallel circuit of oppositely connected devices which will conduct current in either of two directions only if a high voltage appears thereacross, are connected between driver 4 and transducer devices 1—2 to prevent any direct interaction between the transducers 1—2 during reception of sound signals. The devices 9—10 may be comprised of gas filled tubes which become conductive only when a voltage which is high relative to the amplitude of the expected received signals. In this manner the high amplitude sinusoidal variations from driver 4 will be fed to transducers 1 and 2.

During reception of sound signals, the relatively low amplitude voltages appearing at the electrical end of the transducer 1—2 will be insufficient to pass through gaseous devices 9 and 10 and thus the respective contributions from transducers 1 and 2 will be fed to a suitable conventional mixer circuit 7 which produces a signal proportional to the sum of the voltages applied thereto. Mixer 7 is in effect an adder circuit. The output thereof is applied to a suitable receiver 8 where the resultant signal is amplified.

Protective devices 6' and 6" are identical in function to device 6 of Figure 2.

A phase control circuit 3 performs the same function as it did in the embodiment of Figure 2.

The function and operation of the transducer system of Figure 4 is identical to that of the embodiment of Figure 2 except that the voltages produced thereby during reception are added together by a more complex arrangement. The series circuit of the embodiment of Figure 2 inherently adds the voltages $E_1$ and $E_2$ to produce the resultant voltage to form a receiving response pattern of the type described.

The instant invention finds application in an object locator system utilizing the null point of a response pattern to determine the direction of the object. Thus in the specific embodiment shown in Figure 2 a strong directive signal is transmitted in the vicinity of mechanical axis x—x. If a target is located within the beam the energy transmitted will be reflected by the target and will be detected by receiver 5 if the target is not located on the mechanical axis line x—x. The transducers 1—2 are moved as a unit until a null response is noted. The instant invention makes it possible to receive the strongest echoes in the portion of the receiving response pattern which is utilized in obtaining a null, and thus adds appreciably to the sensitivity and accuracy of a signal locator system using the instant invention.

Many modifications may be made of the specific embodiments disclosed without deviating from the broad aspects of the instant invention.

The invention described herein may be manufactured and used by or for the Government of the United States of America for governmental purposes without the payment of any royalties thereon or therefor.

What is claimed is:

1. A directive beam energy propagating and receiving system comprising the combination of a first reciprocal transducer element independently capable of propagating energy in a given space segment when electrical energy is fed to the input thereof, a second anti-reciprocal transducer element independently capable of propagating energy within said given space segment when electrical energy is fed to the input thereof, means coupled to said transducers for simultaneously feeding a sinusoidal driving voltage thereto, and output means coupled to said transducers for combining the voltages produced by said transducers during reception of energy thereby.

2. A directive beam energy propagating and receiving system comprising the combination of a first reciprocal transducer element independently capable of propagating energy in a given space segment when electrical energy is fed to the input thereof, a second anti-reciprocal transducer element independently capable of propagating energy within said given space segment when electrical energy is fed to the input thereof located adjacent said reciprocal transducer and fixedly mounted relative thereto, means coupled to said transducers for simultaneously feeding a sinusoidal driving voltage thereto, and output means coupled to said transducers for combining the voltages produced by said transducers during reception of energy thereby.

3. A directive beam energy propagating and detecting system comprising the combination of a first capacitive transducer element capable of propagating sound energy in a given space segment, a second inductive sound transducer element capable of propagating sound within said given space segment, means coupled to said transducers for simultaneously feeding a sinusoidal driving voltage thereto, and output means coupled to said transducers for combining the voltages produced by said transducers during reception of energy thereby.

4. A directive beam energy propagating and receiving system comprising the combination of a first reciprocal transducer element independently capable of propagating energy in a given space segment when electrical energy is fed to the input thereof, a second anti-reciprocal transducer element independently capable of propagating energy within said given space segment when electrical energy is fed to the input thereof, means coupled to said transducer for simultaneously feeding a sinusoidal driving voltage thereto, and output means coupled to said transducers for combining the voltages produced by said transducers during reception of energy thereby.

5. A directive beam energy propagating and detecting system comprising the combination of a first capacitive sound transducer element capable of propagating sound energy in a given space segment, a second inductive sound transducer element capable of propagating sound within said given segment, means coupled to said transducers for simultaneously feeding a sinusoidal driving voltage thereto, and output means coupled to said transducers for combining the voltages produced by said transducers during reception of energy thereby.

6. A directive beam energy propagating system comprising the combination of a first reciprocal transducer element independently capable of propagating energy in a given space segment when electrical energy is fed to the input thereof, a second anti-reciprocal transducer element independently capable of propagating energy within said given space segment when electrical energy is fed to the input thereof, a source of electrical energy of a given frequency, means coupling the inputs of said transducer elements in series circuit relation across said source of electrical energy, and impedance means shunting one of said transducers for displacing the relative phase of the current fed to the respective inputs of said transducer elements to position the directivity of the transducers at a desired angle.

7. A directive beam energy propagating and receiving system comprising the combination of a first reciprocal transducer element independently capable of propagating energy in a given space segment when electrical energy is fed to the input thereof, a second anti-reciprocal transducer element independently capable of propagating energy within said given space segment when electrical energy is fed to the input thereof located adjacent said reciprocal transducer and fixedly mounted relative thereto, means coupled to said transducers for simultaneously feeding a sinusoidal driving voltage thereto, and output means coupled to said transducers responsive to the vectorial sum of the voltages produced by said transducers during reception of energy thereby, together with means permanently shunting one of said transducers for displacing the relative phase of the current fed to the respective inputs of said transducer elements to produce a substantially quadrature phase relationship.

8. In combination an electrical signal source, a first electrostatic transducer for radiating a first predetermined signal into a medium which propagates said signal, a second electromagnetic transducer for radiating a second signal similar to said predetermined signal in said medium, said first and second transducers both being coupled to said signal source, said transducers having bilateral transmission properties which are reciprocal in one of said transducers and antireciprocal in the other, and output means coupled to both of said transducers for combining signals generated therein by signals in said medium.

9. The combination according to claim 8 wherein a phase shifting means is coupled to one of said transducers for changing the relative phase of currents applied to said transducers.

10. The combination according to claim 8 wherein said first transducer includes a piezoelectric crystal and said transducer includes a core of magnetostrictive material.

References Cited in the file of this patent

UNITED STATES PATENTS

| | | |
|---|---|---|
| 1,674,683 | Hahnemann | June 26, 1928 |
| 1,732,427 | Andrewes | Oct. 22, 1929 |
| 1,889,748 | Gruschke | Dec. 6, 1932 |
| 2,053,364 | Engholm | Sept. 8, 1936 |
| 2,295,527 | Bowley | Sept. 15, 1942 |
| 2,407,242 | Batchelder | Sept. 10, 1946 |
| 2,433,991 | Hebb | Jan. 6, 1948 |
| 2,435,253 | Turner | Feb. 3, 1948 |
| 2,453,521 | Marquis | Nov. 9, 1948 |
| 2,585,173 | Riblet | Feb. 12, 1952 |
| 2,702,379 | Barton | Feb. 15, 1955 |